US006871179B1

United States Patent
Kist et al.

(10) Patent No.: US 6,871,179 B1
(45) Date of Patent: Mar. 22, 2005

(54) METHOD AND APPARATUS FOR EXECUTING VOICE COMMANDS HAVING DICTATION AS A PARAMETER

(75) Inventors: Thomas A. Kist, Boynton Beach, FL (US); Burn L. Lewis, Ossining, NY (US); Bruce D. Lucas, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 495 days.

(21) Appl. No.: 09/348,425

(22) Filed: Jul. 7, 1999

(51) Int. Cl.[7] ................... G10L 15/22; G10L 15/26
(52) U.S. Cl. ................ 704/275; 704/270; 704/257; 704/235
(58) Field of Search ................... 704/270, 275, 704/257, 251, 231, 235

(56) References Cited

U.S. PATENT DOCUMENTS

| | | | | | |
|---|---|---|---|---|---|
| 5,659,665 | A | * | 8/1997 | Whelpley, Jr. | 704/275 |
| 5,664,061 | A | * | 9/1997 | Andreshak et al. | 704/275 |
| 5,799,279 | A | * | 8/1998 | Gould et al. | 704/275 |
| 6,081,782 | A | * | 6/2000 | Rabin | 704/275 |
| 6,088,671 | A | * | 7/2000 | Gould et al. | 704/235 |

\* cited by examiner

Primary Examiner—Abul K. Azad
(74) Attorney, Agent, or Firm—Akerman Senterfitt

(57) ABSTRACT

In a computer speech recognition system, the present invention provides a method and system for recognizing and executing a voice command that has a dictation portion. Upon receiving a user input, the spoken utterance is processed to identify a pattern of words which matches a pre-determined command pattern. Then, computer system command is identified that corresponds to the pre-determined command pattern and has at least one parameter. The parameter is extracted from a dictation portion of the spoken utterance which is separate from the pattern of words matching the command pattern. The computer system command is then processed to perform an event in accordance with the parameter. If the spoken utterance does not contain a pattern of words matching a pre-determined command pattern, then the spoken utterance is recognized as dictation and inserted at a specified location into an electronic document or other system or application software.

10 Claims, 3 Drawing Sheets

METHOD AND APPARATUS FOR EXECUTING VOICE COMMANDS HAVING DICTATION AS A PARAMETER

CROSS REFERENCE TO RELATED APPLICATIONS (Not Applicable).

STATEMENT REGARDING FEDERALLY SPONSORED RESEARCH OR DEVELOPMENT (Not Applicable).

BACKGROUND OF THE INVENTION

1. Technical Field

This invention relates to the field of computer speech recognition and more particularly to a method and system for executing voice commands having ordinary dictation as a parameter.

2. Description of the Related Art

Speech recognition is the process by which an acoustic signal received by microphone is converted into a set of words by a computer. These recognized words may then be used in a variety of computer software applications. For example, speech recognition may be used to input data, prepare documents and control the operation of system and application software.

Speech recognition systems can recognize and insert dictated text in a variety of software applications. For example, one can use a speech system to dictate a letter into a word processing document. Simply stated, a speech recognition engine receives the user's dictated words in the form of speech signals, which it processes using known algorithms. The processed signals are then "recognized" by identifying a corresponding text phrase in a vocabulary database. The text is then conveyed to an active software application, where it is displayed. This type of spoken utterance is considered to be ordinary dictation because it is merely transcribed and does not execute a control command.

As mentioned, the speech recognition system may also be used to control the operation of voice-enabled system and application software. Typically, the software is controlled by a user issuing voice commands for performing system or application events. There are two broad categories of speech recognition systems for executing voice commands: natural language understanding (NLU) systems and finite state grammar systems. NLU systems permit total linguistic flexibility in command expression by recognizing as commands, spoken phrases in terms naturally intuitive to the speaker. For example, an NLU system is likely to recognize the spoken utterance, "would you be a dear and open the Pensky file for me?", as instructing the system to execute a "file open" command for the file named "Pensky". However, NLU systems are extremely complex, and at this point, operate only on very sophisticated computers.

Consequently, the vast majority of commercial speech recognition systems are finite grammar systems. In a simple finite grammar system, the user in the above example would utter a much more structured phrase, such as, "open file Pensky". Upon receiving the speech signals corresponding to the spoken phrase, the speech recognition engine processes the signals to determine whether they correspond to a command coded within one or more command sets or grammars. If so, the command is processed and executed by the software so as to perform the corresponding event, in this case, opening the "Pensky" file.

The simplest command grammars correlate each command or function that the system can perform to one speech command. More advanced finite state grammar systems allow for increased linguistic flexibility by including alternative commands for performing each function, so that a speaker can utter any one of a number of expressions to perform the event. Typically, these systems convert spoken phrases into one of a finite set of functional expressions using translation rules or by parsing annotation in the grammar. These systems, despite having a finite grammar system, enable a user to speak more naturally when issuing voice commands.

As stated, existing speech recognition systems are capable of receiving speech signals from a user and either recognizing the signals as ordinary dictation or as a voice command for performing an event. However, typical speech systems are unable to recognize voice commands that include ordinary dictation so as to execute a command having dictation as a parameter.

One example of such a voice command is, "send a note to Bill regarding today's meeting", which is intended to call up an E-mail application that will send a message to a colleague named "Bill" with "today's meeting" displayed in the message subject text field. Typical speech systems are likely to interpret this statement as ordinary dictation, transcribing the entire spoken phrase as text in a document, despite the fact that it includes elements of both a command and ordinary dictation. Alternatively, the statement may be recognized only as a command to execute the E-mail application, without inserting the dictation "today's meeting" in the subject line.

A basic reason existing speech systems have difficulty with these types of mixed voice commands is that the command grammars contain only a finite number of command patterns. It is impractical, if not impossible, to code into a command grammar the tens of thousands of words or word combinations in a given language. Thus, typical systems limit the grammar sets to contain phrases indicating functions relevant to performing computer software events. These functional phrases comprise a much smaller sub-set of an entire language, yet are extremely useful in carrying out software application events. Because the vast majority of phrases used in ordinary dictation are left out of the command grammars, typical finite speech systems are unable to incorporate the dictation portion in commands.

Accordingly, there is a need to provide a finite grammar speech recognition system able to execute voice commands having ordinary dictation as a parameter.

SUMMARY OF THE INVENTION

The present invention provides a method and system to execute voice commands, having ordinary dictation as a parameter, for performing system and application software events.

Specifically, in a system adapted for speech recognition, the present invention provides a method for executing a voice command in the form of a spoken utterance having a dictation portion. The method begins by receiving a user input corresponding to the spoken utterance. This input is processed to identify a pattern of words forming the spoken utterance which matches a predetermined command pattern. A computer system command is identified that corresponds to the pre-determined command pattern and has at least one parameter. The one or more parameters are extracted from words contained in a dictation portion of the voice command which are distinct from the pattern of words matching the command pattern. The computer system command is then processed to perform an event in accordance with the one or more command parameters.

Another aspect of the invention is that the words forming the dictation portion of the voice command may be embedded within the pattern of words matching the command pattern. The dictation portion of the voice command can be comprised of any set of words in a voice recognition engine vocabulary. Consequently, the event performed by the system can include inserting the dictation portion of the spoken utterance at a location in a word processing document or any other location specified by the computer system command.

Still another aspect of the invention is that the system may identify a pattern of words in the spoken utterance to match any one of a plurality of the pre-determined command patterns. Each of the plurality of command patterns can belong to at least one pre-determined command pattern set. According to a preferred embodiment, a command pattern in any of the sets can only be matched when the set is in an active state. The command pattern sets are placed in an active state according to the operating state of the computer system. If no pattern of words forming the spoken utterance matches the predetermined command pattern, the system provides a software application with recognized text.

Another preferred embodiment of the present includes a system for executing a voice command in the form of a spoken utterance having a dictation portion. Specifically, the system includes programming for receiving a user input corresponding to the spoken utterance. The system also includes programming for identifying a pattern of words forming the spoken utterance which matches a pre-determined command pattern as well as a computer system command that corresponds to the pre-determined command pattern and has at least one parameter. Also, the system includes programming for extracting the one or more parameters from words contained in a dictation portion of the voice command, which are distinct from the pattern of words matching the command pattern. The computer system command is then processed to perform an event in accordance with the one or more command parameters.

Another aspect of this system is that the words forming the dictation portion of the voice command may be embedded within the pattern of words matching the command pattern. The dictation portion of the voice command can be comprised of any set of words in a voice recognition engine vocabulary. Consequently, the system can include programming for inserting the dictation portion of the spoken utterance at a location in a word processing document or any other location specified by the computer system command.

Yet another aspect of this system is that it includes programming to identify a pattern of words in the spoken utterance to match any one of a plurality of the pre-determined command patterns. Each of the plurality of command patterns can belong to at least one pre-determined command pattern set. According to another preferred embodiment, a command pattern in any of the sets can only be matched when the set is in an active state. The command pattern sets are placed in an active state according to the operating state of the computer system. If no pattern of words forming the spoken utterance matches the pre-determined command pattern, programming is included to provide a software application with recognized text.

Thus, the present invention provides the object and advantage of recognizing spoken utterances that include a combination of voice commands and ordinary dictation. Once recognized, events can be performed according to the dictation portion of the spoken utterances.

These and other objects, advantages and aspects of the invention will become apparent from the following description. In the description, reference is made to the accompanying drawings which form a part hereof, and in which there is shown a preferred embodiment of the invention. Such embodiment does not necessarily represent the full scope of the invention and reference is made therefore, to the claims herein for interpreting the scope of the invention.

DETAILED DESCRIPTION OF THE PREFERRED EMBODIMENT

Figure 1:
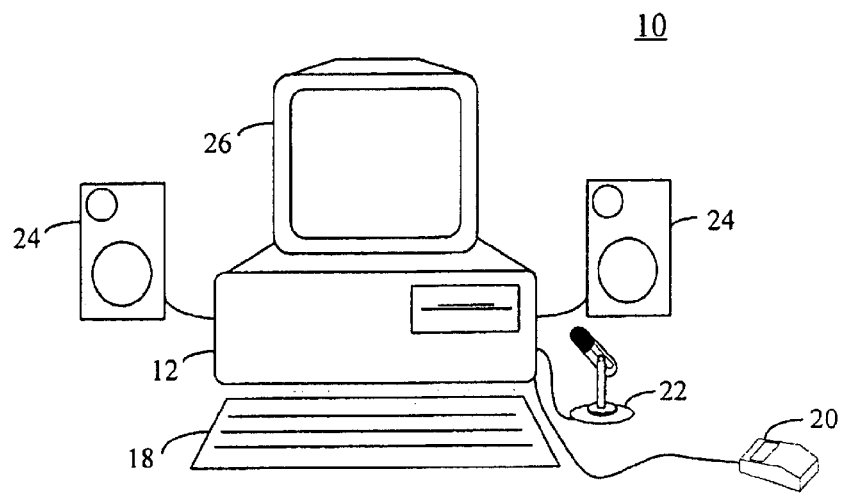
FIG. 1 shows a computer system for speech recognition with which the method and system of the present invention may be used.
Figure 2:
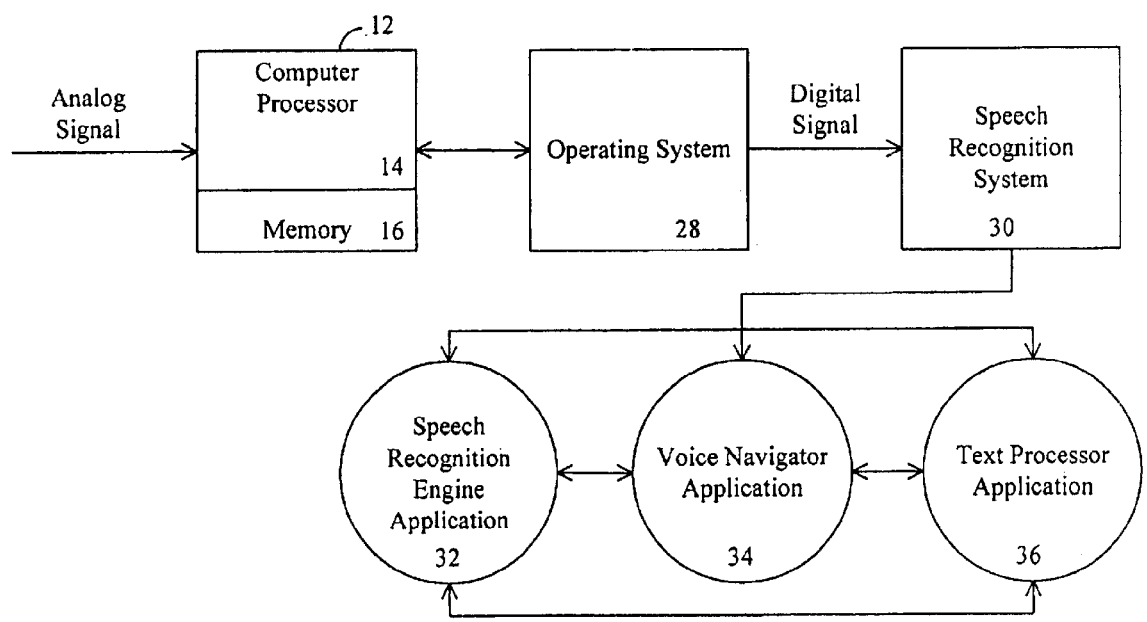
FIG. 2 is a block diagram showing a typical architecture for the computer system of FIG. 1 having a speech recognition engine.

Referring to the drawings in detail, wherein like reference characters represent corresponding elements throughout the several views, more specifically referring to FIG. 1, a computer system with which the present invention may be practiced is referred to generally by reference number 10. Referring to FIGS. 1 & 2, the computer system 10 is preferably comprised of a computer 12 having a central processor 14, at least one memory device 16 and related electronic circuitry (not shown). The computer system 10 also includes user input devices, a keyboard 18 and a pointing device 20, a microphone 22, audio loud speakers 24, and a video display 26, all of which are operatively connected to the computer 12 via suitable interface circuitry. The keyboard 18, pointing device 20 and loud speakers 24 may be a part of the computer system 10, but are not required for the operation of the invention.

Generally, the computer system 10, as described above, can be satisfied by any one of many high-speed multi-media personal computers commercially available from manufacturers such as International Business Machines Corporation, Compaq, Hailed Packard, or Apple Computers. The memory device 16 preferably includes an electronic random access memory module and a bulk storage device, such as a magnetic disk drive. The central processor 14 may include any suitable processing chip, such as any of the Pentium family microprocessing chips commercially available from Intel Corporation.

Referring to FIG. 2, which illustrates a typical architecture for a computer system 10 adapted for speech recognition, the system includes an operating system 28 and a speech recognition system 30. The speech recognition system 30 comprises a speech recognition engine application 32 and a voice navigation application 34. A speech text processor application 36 may also be included. However, the invention is not limited in this regard and the speech recognition engine application 32 can be used with any other application program which is to be voice enabled. Also, the speech recognition engine 32, voice navigator 34 and text processor 36 are shown in FIG. 2 as separate application programs. It should be noted, however, that these applications could be implemented as a single, more complex application.

In a preferred embodiment, the operating system 28 is one of the Windows family of operating systems, such as Windows NT, Windows '95 or Windows '98, which are available from Microsoft Corporation of Redmond, Wash. The present invention is not limited in this regard, however, as it may also be used with any other type of computer operating system.

Referring still to FIG. 2, in general, an analog audio signal containing speech commands is received by the microphone 22 and processed within the computer 12 by conventional audio circuitry, having an analog to digital convertor, which produces a digitized form of the signal. The operating system 28 transfers the digital command signal to the speech recognition system 30, where the command is recognized by the speech recognition engine 32.

Figure 3:
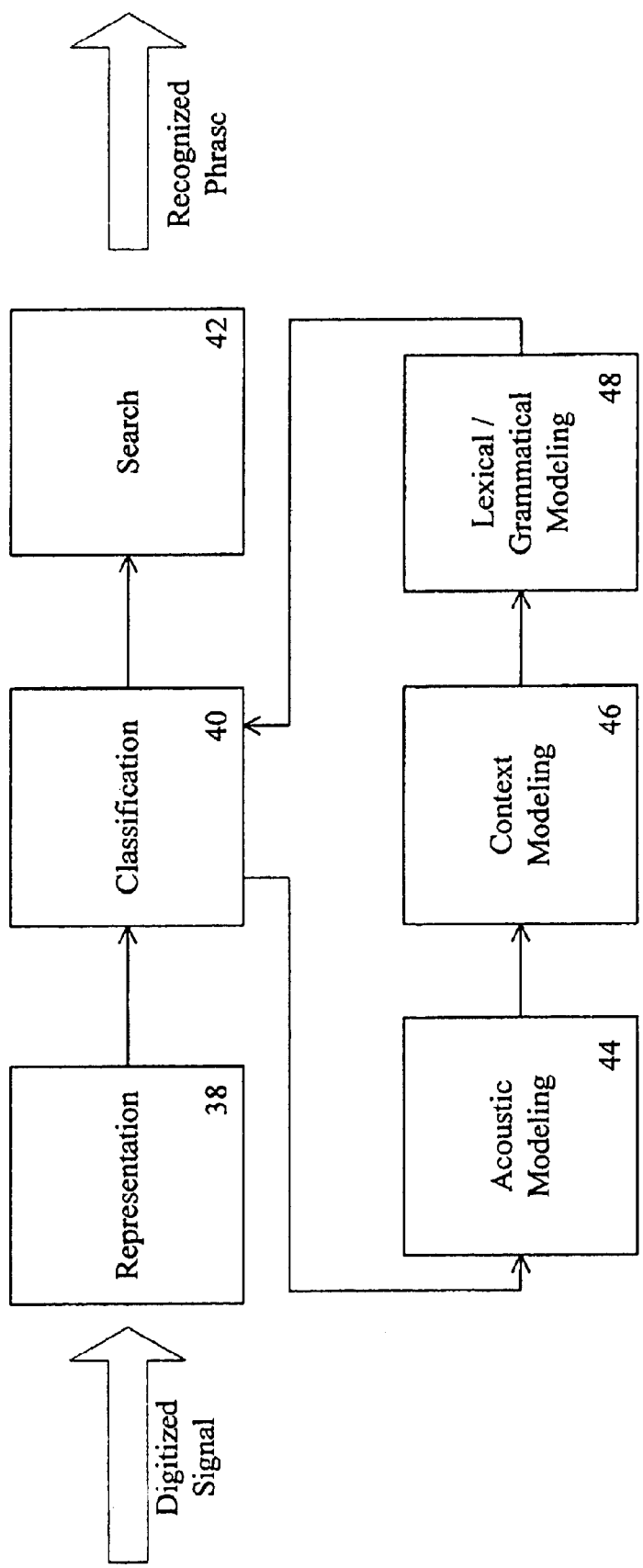
FIG. 3 is a block diagram showing the architecture for a speech recognition engine using multiple constraints in the recognition process.

FIG. 3 illustrates an architecture for a finite grammar speech recognition system using multiple constraints during the recognition process. Generally, the speech recognition engine 32 receives the digitized speech signal from the operating system 28. The signal is subsequently transformed in representation block 38 into a useful set of data by sampling the signal at some fixed rate, typically every 10–20 msec. The representation block produces a new representation of the audio signal which can then be used in subsequent stages of the voice recognition process to determine the probability that the waveform portion just analyzed corresponds to a particular phonetic event. This process is intended to emphasize perceptually important speaker independent features of the speech signals received from the operating system. In classification block 40, the processed speech signal is used to identify a subset of probable phrases corresponding to the speech signal. This subset of probable phrases is searched at block 42 to obtain the recognized phrase.

Referring still to FIG. 3, classification block 40 is preferably performed by acoustic modeling block 44, context modeling block 46 and lexical/grammatical modeling block 48. At acoustic modeling block 44, known algorithms process the speech command signal to adapt speaker-independent acoustic models, contained in memory 16, to the acoustic signal of the current speaker and identify one or more probable matching phrases.

At block 46, additional algorithms may be used to process the speech signal according to the current state of the computer system as well as context events, including prior commands, system control activities, timed activities, and application activation, occurring prior to or contemporaneously with the spoken command. Specifically, these data structures include activities such as: user inputs by voice, mouse, stylus or keyboard; operation of drop-down menus or buttons; the activation of applications or applets within an application; prior commands; and idle events, i.e., when no activity is logged in an event queue for a prescribed time period. The system states and events can be statistically analyzed, using statistical modeling techniques, to identify one or more probable commands matching the context in which the command was given.

At block 48, algorithms conform the digitized speech signal to lexical and grammatical models. These models are used to help restrict the number of possible words corresponding to a speech signal according to a word's use in relation to neighboring words. The lexical model may be simply a vocabulary of words understood by the system. The grammatical model, sometimes referred to as a language model, may be specified simply as a finite state network, where the permissible words following each word are explicitly listed, but is preferably a more sophisticated finite grammar having a plurality of grammar sets containing multiple command patterns, as described below.

In its preferred embodiment, the present invention includes all three of the above-described modeling techniques. However, the invention is not limited in this regard and can be performed using alternative modeling techniques. For example, it may be practiced without the event-based context modeling step. Also, each modeling technique may be performed independently from, or interdependently with, the other models.

Figure 4:
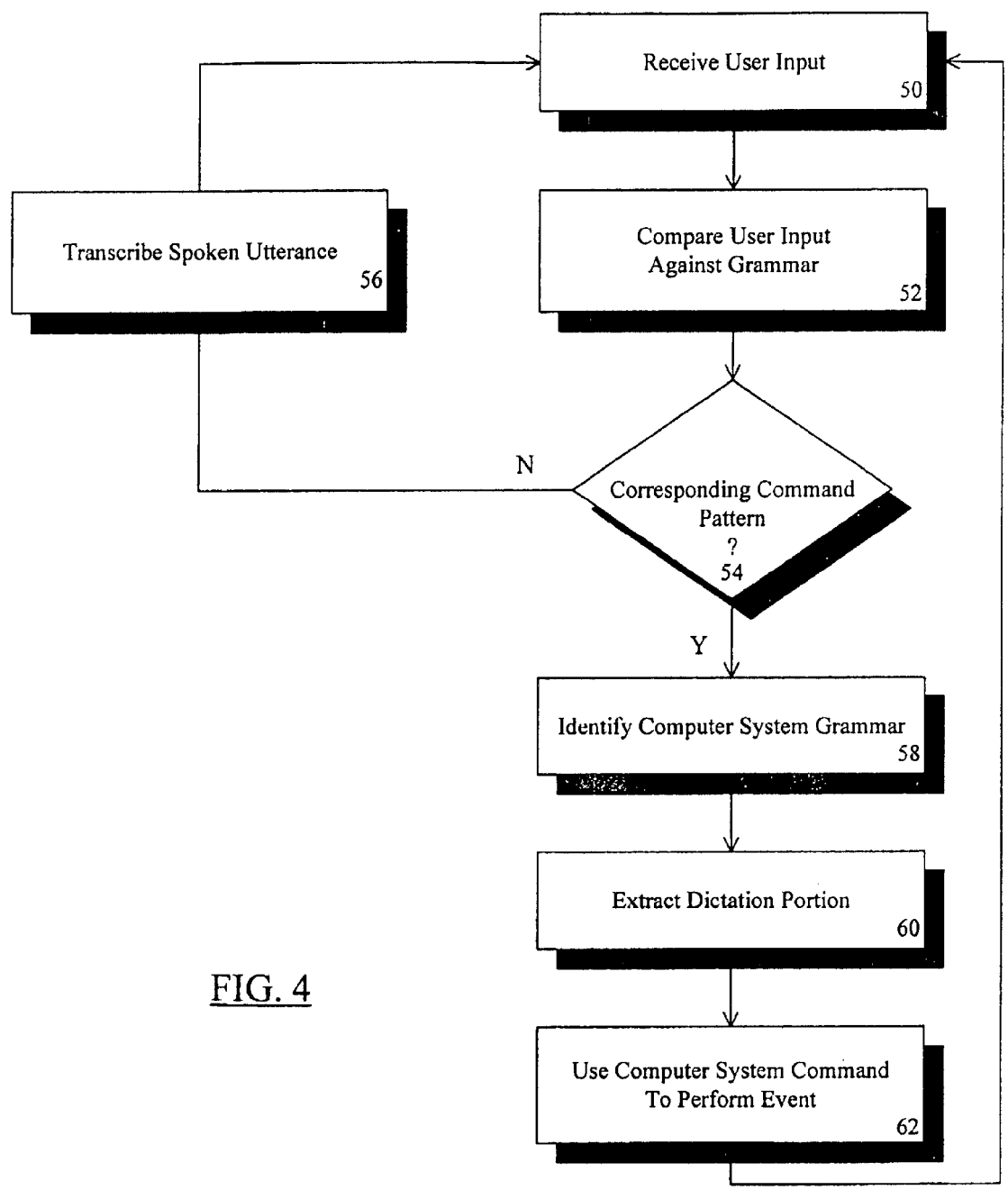
FIG. 4 is a flow chart showing the process for executing voice commands incorporating ordinary dictation according to the present invention.

Referring now to FIG. 4, at step 50, the system receives a user input in the form of a spoken utterance. Spoken utterances can be issued as ordinary dictation, voice commands or voice commands incorporating dictation. Ordinary dictation is a spoken utterance which does not contain a pattern of words recognizable by the system for controlling the operation of system or application software. Instead, dictation is spoken merely to have the system convert the spoken words into text within an electronic document. Typically, a user issues ordinary dictation when preparing a letter or inputting data within an application text field. On the other hand, a voice command is a spoken utterance which causes the system to perform a pre-determined function within system or application software other than simply transcribing text, such as opening a file, deleting text in a document or repositioning an active "window". A voice command incorporating dictation is a combination of these two utterances, having words comprising a dictation portion embedded within a pattern of words comprising a command.

Although the system of the present invention can be used to recognize all three types of spoken utterances, the invention is intended to address the unique difficulties in recognizing voice commands incorporating dictation. Accordingly, the following discussion will focus on the voice commands mixed with dictation.

Typical speech systems are likely to interpret these mixed spoken utterances as ordinary dictation, transcribing the entire spoken phrase as text in a document, or the dictation may be ignored. As mentioned above, the primary reason existing speech systems have difficulty with these types of mixed voice commands is that the command grammars are, by necessity, coded with a limited number of command patterns. Because the vast majority of phrases used in ordinary dictation are left out of the command grammars, typical finite speech systems are unable to incorporate the dictation portion within the command.

Referring still to FIG. 4, the process advances to step 52, wherein the system recognizes whether the spoken utterance contains a recognizable pattern of words by comparing the recognized words against a plurality of predetermined command patterns of words contained in one or more active command pattern sets or grammars. Individual command pattern sets are placed in an active state depending upon the state in which the computer system is operating when the voice command is issued.

An exemplary mixed voice command is, "schedule a meeting on Thursday regarding next quarter's sales plan". This utterance is issued by a user to initiate a voice-enabled scheduling application and insert the text "next quarter's sales plan" in a meeting text field at a calendar location for Thursday. The utterance is comprised of the command portion "schedule a meeting on Thursday regarding" and the dictation portion "next quarter's sales plan".

The dictation may be comprised of any set of words in a voice recognition vocabulary, which could consist of tens of thousands of words. The pattern of words forming the command, on the other hand, must conform to the limited command patterns coded into one or more of the active command grammars. Thus, the system searches the active command grammars for a command pattern corresponding to the recognized speech signals.

For the above example, a corresponding command grammar can be coded to include separate scheduling commands for each day of the week. Preferably, however, a primary command pattern is coded into the grammar having a "day" variable marker indicating that the day of the week may any one of the days coded as a sub-command pattern in the same or a different grammar. In this way, the system can schedule a meeting for any day of the week with only one primary pattern coded into the grammar. This technique is not limited to the days of the week, and can be employed for any other category of terms such as months, colors, names, telephone numbers, etc.

At step 54, if the system is unable to match the words of the spoken utterance with a corresponding pre-determined command pattern, the process advances to step 56, at which point the entire phrase is deemed to be dictation. The system then identifies one or more text phrases in a vocabulary set corresponding to the entire spoken utterance and inserts the text in an active software application.

Otherwise, at step 58, if a matching command pattern is identified in the preceding step, the system identifies a corresponding computer system command expression. A computer system command is a functional expression used by the system or application software for performing an event. The speech recognition engine coordinates the grammar with a suitable scripting program to cast the computer system command in a form recognizable to the desired speech-enabled system or application software for performing the desired event. The command expression includes one or more parameters corresponding to the voice command. At step 60, at least one of these parameters is extracted from the dictation portion of the voice command. The entire dictation portion may constitute a command expression parameter, or it may be broken down into sub-portions used as separate parameters.

It will be appreciated by those skilled in the art that the precise mechanism for identifying and scripting the command expression can vary from system to system. One approach involves the use of translation or rewrite rules. These rules are coded within the command grammars to generate the command expression. For instance, a translation rule for the above example is "schedule a meeting for <day> regarding <text>>⇒schedulemeeting(<day>, <text>)". This rule includes two variable parameters <day> and <text>. Appropriate day parameters are provided as a sub-pattern coded within the active command grammar. The day of the week spoken by the user is matched against this set of sub-patterns and used to identify the intended day of the week in the calendar. The text parameter is extracted from the entire dictation portion "next quarters sales plan". Thus, applying the rule to the spoken utterance of the example, the scripting program generates the computer system command: "schedulemeeting(Thursday, next quarter sales plan)".

This is one example of a translation rule and it will be recognized by those skilled in the art that many different translation rules are possible for use with different commands and formats, all such rules being within the scope of the invention. For systems that do not support translation rules, different methods of producing the command expression of the command would be required. For example, a parsing program can be used for this purpose to parse annotation in the grammar set. It will be appreciated by those skilled in the art 1 that any suitable procedure can be used to accomplish the foregoing result provided that it is capable of taking a given phrase and determining its functional command expression or result.

Referring still to FIG. 4, at step 62, the command expression is sent to the active application to perform the event. In particular, for the above example, the application opens a scheduling program and inserts "next quarter's sales plan" in a suitable meeting text field for Thursday. The process then returns to step 50 to receive additional user input.

The above example illustrates that the present invention can be used to insert or "paste" the dictation portion of the spoken voice command into a system or application program. However, the present invention is not limited in this regard as the dictation portion may be incorporated into a computer system command to perform any number of functions or events. For example, the user may issue the command "load all files regarding first quarter results". In this example, the system will recognize "load all files regarding" as a pattern of words matching a pre-determined grammar command. A translation rule such as "load all files regarding <text>"⇒loadfiles(<text>)", having a single parameter comprising the dictation portion "first quarter results" is applied to create the computer system command "loadfiles(first quarter results)". This command is then used, for example, by a word processing application to search the file names of all stored documents for the text "first quarter results", or the closest match, and then to open up the corresponding files.

While the foregoing specification illustrates and describes the preferred embodiments of the invention, it is to be understood that the invention is not limited to the precise construction herein disclosed. The invention can be embodied in other specific forms without departing from the spirit or essential attributes of the invention. Accordingly, reference should be made to the following claims, rather than to the foregoing specification, as indicating the scope of the invention.

We claim:

1. In a speech recognition system, a method of processing a voice command comprising:

identifying a voice command having a voice command component and a dictation component within a contiguous utterance, wherein said voice command component is specified by a command grammar and said dictation component is free-form text which is not specified by said command grammar, and wherein said dictation component is embedded within said voice command; and executing said identified voice command component using at least a part of said dictation component as an execution parameter of said voice command.

2. The method of claim 1, wherein said executing step comprises:

loading a translation rule and linking said voice command component to an application command using said translation rule; and providing said application command to an associated computing application.

3. The method of claim 2, wherein said providing step comprises providing said at least a part of said dictation component as a parameter of said application command to said associated computing application.

4. The method of claim 3, wherein said providing step further comprises inserting said at least a part of said dictation component in a text field of said associated computing application.

5. The method of claim 1, wherein said executing step comprises providing said voice command component to an associated computing application for processing, and further providing said at least a part of said dictation component as a parameter of said voice command to said computing application.

6. A machine-readable storage, having stored thereon a computer program having a plurality of code sections executable by a machine for causing the machine to perform the steps of:

identifying a voice command having a voice command component and a dictation component within a contiguous utterance, wherein said voice command component is specified by a command grammar and said dictation component is free-form text which is not specified by said command grammar, and wherein said dictation component is embedded within said voice command; and executing said identified voice command component using at least a part of said dictation component as an execution parameter of said voice command.

7. The machine-readable storage of claim 6, further comprising:

loading a translation rule and linking said voice command component to an application command using said translation rule; and providing said application command to an associated computing application.

8. The machine-readable storage of claim 7, wherein said providing step comprises providing said at least a part of said dictation component as a parameter of said application command to said associated computing application.

9. The machine-readable storage of claim 8, wherein said providing step further comprises inserting said at least a part of said dictation component in a text field of said associated computing application.

10. The machine-readable storage of claim 6, wherein said executing step comprises providing said voice command component to an associated computing application for processing, and further providing said at least a part of said dictation component as a parameter of said voice command to said computing application.

* * * * *

(12) EX PARTE REEXAMINATION CERTIFICATE (8711th)
United States Patent
Kist et al.

(10) Number: US 6,871,179 C1
(45) Certificate Issued: Nov. 29, 2011

(54) METHOD AND APPARATUS FOR EXECUTING VOICE COMMANDS HAVING DICTATION AS A PARAMETER

(75) Inventors: Thomas A. Kist, Boynton Beach, FL (US); Burn L. Lewis, Ossining, NY (US); Bruce D. Lucas, Yorktown Heights, NY (US)

(73) Assignee: Nuance Communications, Inc., Burlington, MA (US)

Reexamination Request:
No. 90/011,271, Oct. 8, 2010

Reexamination Certificate for:
Patent No.: 6,871,179
Issued: Mar. 22, 2005
Appl. No.: 09/348,425
Filed: Jul. 7, 1999

(51) Int. Cl.
*G10L 15/00* (2006.01)
*G10L 15/26* (2006.01)
*G10L 15/22* (2006.01)

(52) U.S. Cl. .................. 704/275; 704/235; 704/257; 704/270; 704/E15.045

(58) Field of Classification Search .................. None
See application file for complete search history.

(56) References Cited

To view the complete listing of prior art documents cited during the proceeding for Reexamination Control Number 90/011,271, please refer to the USPTO's public Patent Application Information Retrieval (PAIR) system under the Display References tab.

*Primary Examiner*—Rachna Desai

(57) ABSTRACT

In a computer speech recognition system, the present invention provides a method and system for recognizing and executing a voice command that has a dictation portion. Upon receiving a user input, the spoken utterance is processed to identify a pattern of words which matches a pre-determined command pattern. Then, computer system command is identified that corresponds to the pre-determined command pattern and has at least one parameter. The parameter is extracted from a dictation portion of the spoken utterance which is separate from the pattern of words matching the command pattern. The computer system command is then processed to perform an event in accordance with the parameter. If the spoken utterance does not contain a pattern of words matching a pre-determined command pattern, then the spoken utterance is recognized as dictation and inserted at a specified location into an electronic document or other system or application software.

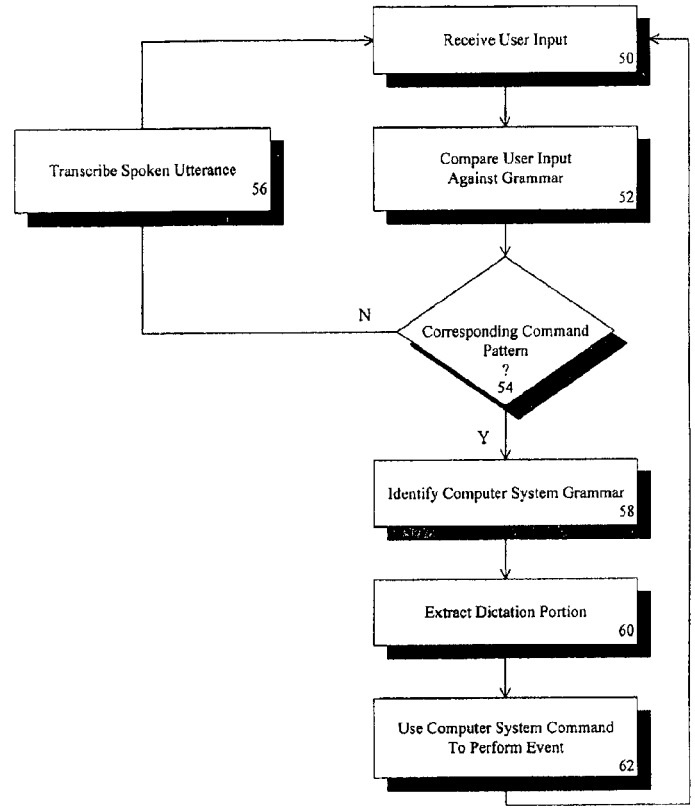

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1-10 is confirmed.

New claims 11-18 are added and determined to be patentable.

*11. The method of claim 1, wherein the executing said identified voice command component using at least a part of said dictation component as an execution parameter of said voice command comprises performing an event in accordance with the execution parameter.*

*12. The method of claim 1, wherein the command grammar specifies a pattern of words specifying the voice command component and wherein the words forming the dictation component of the voice command are embedded with the words in the voice command matching the pattern of words.*

*13. The method of claim 1, wherein the voice command comprises a plurality of execution parameter, and wherein the executing said identified voice command component using at least a part of said dictation component as an execution parameter of said voice command comprises extracting two or more of the plurality of execution parameters from the dictation component and performing an event in accordance with the two or more execution parameters.*

*14. The method of claim 1, wherein the command grammar includes at least one variable marker specifying that the voice command component includes at least one variable.*

*15. The machine readable storage of claim 6, wherein the executing said identified voice command component using at least a part of said dictation component as an execution parameter of said voice command comprises performing an event in accordance with the execution parameter.*

*16. The machine readable storage of claim 6, wherein the command grammar specifies a pattern of words specifying the voice command component and wherein the words forming the dictation component of the voice command are embedded with the words in the voice command matching the pattern of words.*

*17. The machine readable storage of claim 6, wherein the voice command comprises a plurality of execution parameters, and wherein the executing said identified voice command component using at least a part of said dictation component as an execution parameter of said voice command comprises extracting two or more of the plurality of execution parameters from the dictation component and performing an event in accordance with the two or more execution parameters.*

*18. The machine readable storage of claim 6, wherein the command grammar includes at least one variable marker specifying that the voice command component includes at least one variable.*

\* \* \* \* \*